(12) United States Patent
Kim

(10) Patent No.: US 8,463,915 B1
(45) Date of Patent: Jun. 11, 2013

(54) METHOD FOR REDUCING DNS RESOLUTION DELAY

(75) Inventor: Songkuk Kim, Scarsdale, NY (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 12/884,718

(22) Filed: Sep. 17, 2010

(51) Int. Cl.
*G06F 15/16* (2006.01)
(52) U.S. Cl.
USPC ............................................................ 709/227
(58) Field of Classification Search
USPC ............................................................ 709/277
See application file for complete search history.

(56) References Cited

U.S. PATENT DOCUMENTS

| | | | |
|---|---|---|---|
| 6,606,645 B1 * | 8/2003 | Cohen et al. ................ | 709/203 |
| 2007/0083670 A1 * | 4/2007 | Kelley et al. ................ | 709/245 |
| 2010/0274970 A1 * | 10/2010 | Treuhaft et al. ............. | 711/118 |
| 2010/0332680 A1 * | 12/2010 | Anderson et al. ........... | 709/245 |
| 2011/0153867 A1 * | 6/2011 | van de Ven et al. ......... | 709/245 |
| 2011/0320524 A1 * | 12/2011 | Nandagopal ................ | 709/203 |

OTHER PUBLICATIONS

E. Cohen and H. Kaplan, "Proactive caching of DNS records: addressing a performance bottleneck," Proceedings of the Symposium on Applications and the Internet (SAINT 2001), pp. 85-94.*
Cohen et al., "Proactive Caching of DNS Records: Addressing a Performance Bottleneck," In Proceedings of the Symposium on Applications and the Internet, 2001, 10 pages.

* cited by examiner

*Primary Examiner* — Mark Rinehart
*Assistant Examiner* — Kenneth P Hunt
(74) *Attorney, Agent, or Firm* — Lerner, David, Littenberg, Krumholz & Mentlik, LLP

(57) ABSTRACT

In order to access a web site, for example one identified by a domain name, a client device must determine the network location, or IP address, of the webs site. In one example, the corresponding IP address of the domain name has been stored locally at the client device but has expired. The client device may send a request to network location of the expired IP address while concurrently sending a request to a domain name server for updated IP address information. If the updated IP address received from the server is the same as the expired IP address, the client device may request the web site information from the previously established connection. If the updated IP address is not the same as the expired IP address, the client device may abort the connection with the expired IP address and establish a new connection with the updated IP address.

17 Claims, 10 Drawing Sheets

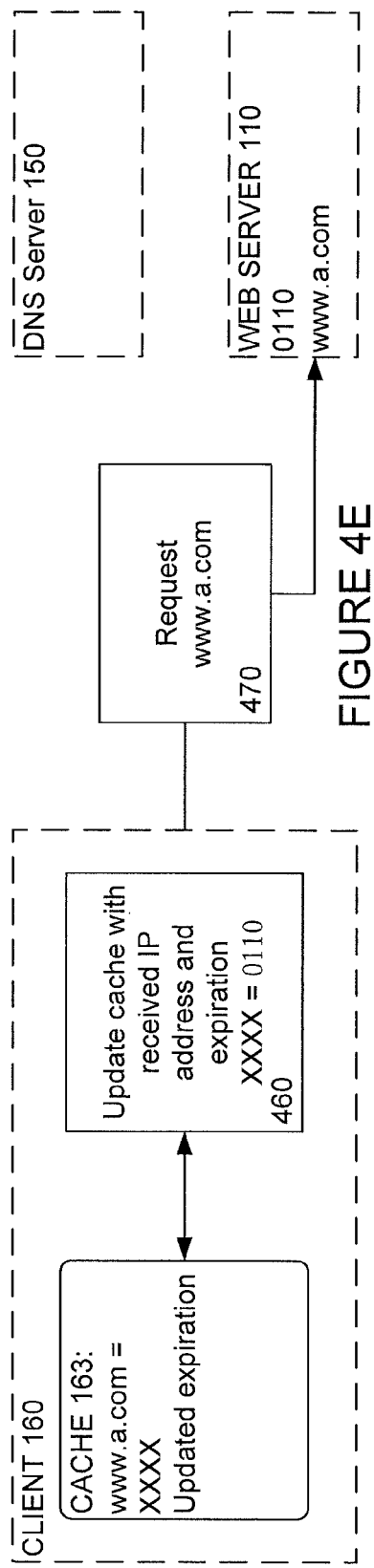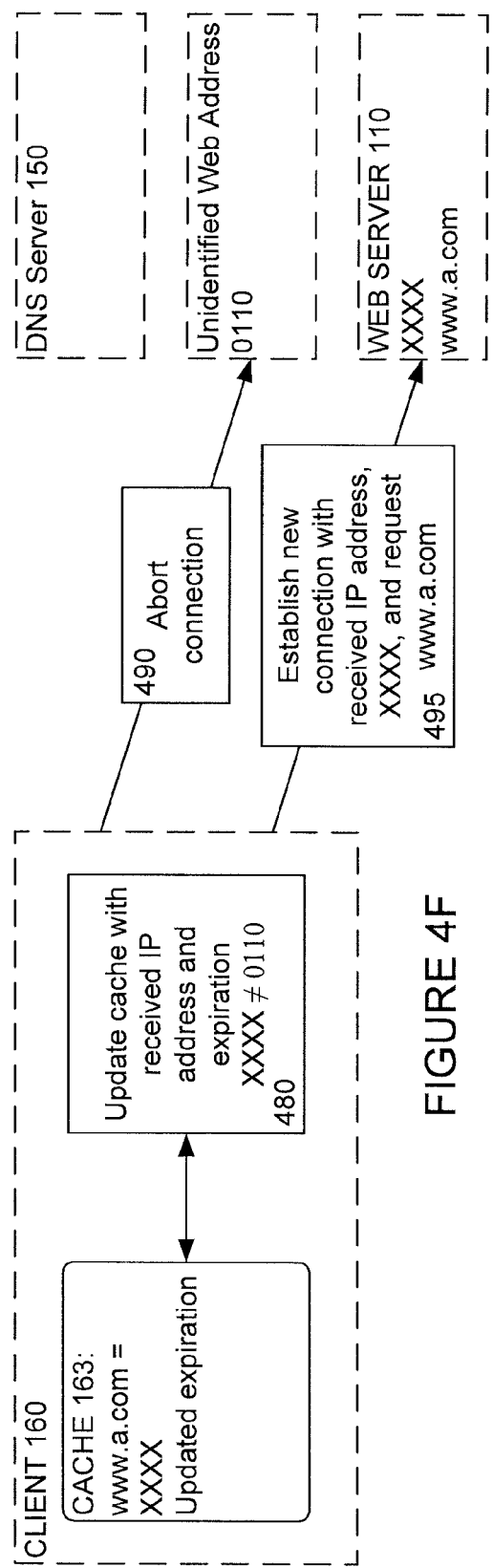

US 8,463,915 B1

METHOD FOR REDUCING DNS RESOLUTION DELAY

BACKGROUND OF THE INVENTION

When a computer receives a web site domain name, in order to retrieve the web site, the computer identifies the associated IP address of the domain name. The IP address may describe, for example, a network location of a server computer which administers the web site. An IP address may be associated with an expiration after which the IP address may no longer be valid.

Presently, in order to identify an IP address associated with a particular domain name, the computer will first look to the computer's local storage. For example, if the computer has previously identified the IP address of the particular domain name, the computer may store this information locally along with expiration information. If the associated IP address is stored locally, the computer will determine whether the IP address has expired based on the expiration information. If the IP address has not expired, the client device will use the locally stored IP address to retrieve the web site.

If the IP address is not stored locally or has expired, the computer will send a request to a domain name server ("DNS") for the corresponding IP address. Subsequently, the client device will use the IP address received from the DNS server to request the web site and update the locally stored IP address information.

As locally stored IP address information is valid for only a limited period of time, computers must frequently transmit such requests and wait for updated information before accessing a web site. In addition, more popular domains may use shorter expiration periods which result in more frequent requests to a DNS by a computer. As a result, this process may contribute to slowing down the loading of web pages, particularly in mobile devices. It may also consume substantial network bandwidth.

BRIEF SUMMARY OF THE INVENTION

The present invention relates generally to reducing the time for a client device to request and receive information for a web site. More specifically, aspects of the invention use expired IP addresses to establish tentative connections and only request a web site if the expired IP address is confirmed as the current IP address.

Aspects of the invention provide a method including identifying, by a processor, a domain name associated with a web site; retrieving an expired IP address stored in memory accessible by the processor, the expired IP address being associated with the domain name and an expired time period; establishing a connection between the processor and a node of the network based on the expired IP address, wherein the connection is established without requesting content from the node; while establishing the connection, transmitting a request to a domain name server for an updated IP address based on the domain name; and comparing the updated IP address with the expired address to determine if the expired IP address is the same as the expired address.

In one example, the method also includes transmitting a request for content to the node only if the updated IP address is the same as the expired IP address. In another example, the method also includes aborting the connection if the updated IP address is different from the expired address; establishing a second connection with a second node of the network based on the updated IP address; and requesting content from the second node. In another example, the method also includes receiving the updated IP address and an associated expiration and storing the updated IP address and the associated expiration in the memory. In another example, the memory is cache memory. In another example, the established connection is a TCP connection with the node. In another example, the updated IP address is associated with an email server. In another example, the updated IP address is associated with a VOIP server. In another example, the updated IP address is associated with a web site server.

Other aspects of the invention provide a device including memory for storing IP addresses and a processor coupled to the memory. The processor is operable to identify, a domain name associated with a web site; retrieve an expired IP address stored in memory accessible by the processor, the expired IP address being associated with the domain name and an expired time period; establish a connection between the processor and a node of the network based on the expired IP address, wherein the connection is established without requesting content from the node; while establishing the connection, transmit a request to a domain name server for an updated IP address based on the domain name; and transmit a request for content to the node only if the updated IP address is the same as the expired IP address.

In one example, the processor is also operable to abort the connection if the updated IP address is different from the expired address; establish a second connection with a second node of the network based on the updated IP address; and request content from the second node. In another example, the processor is further operable to receive the updated IP address and an associated expiration and store the updated IP address and the associated expiration in the memory. In another example, the memory is cache memory. In another example, the established connection is a TCP connection with the node. In another example, the updated IP address is associated with an email server. In another example, the updated IP address is associated with a VOIP server. In another example, the updated IP address is associated with a web site server.

BRIEF DESCRIPTION OF THE DRAWINGS

FIGS. 4A-4F are a functional diagram of a system in accordance with an aspect of the invention.

DETAILED DESCRIPTION

Figure 1:
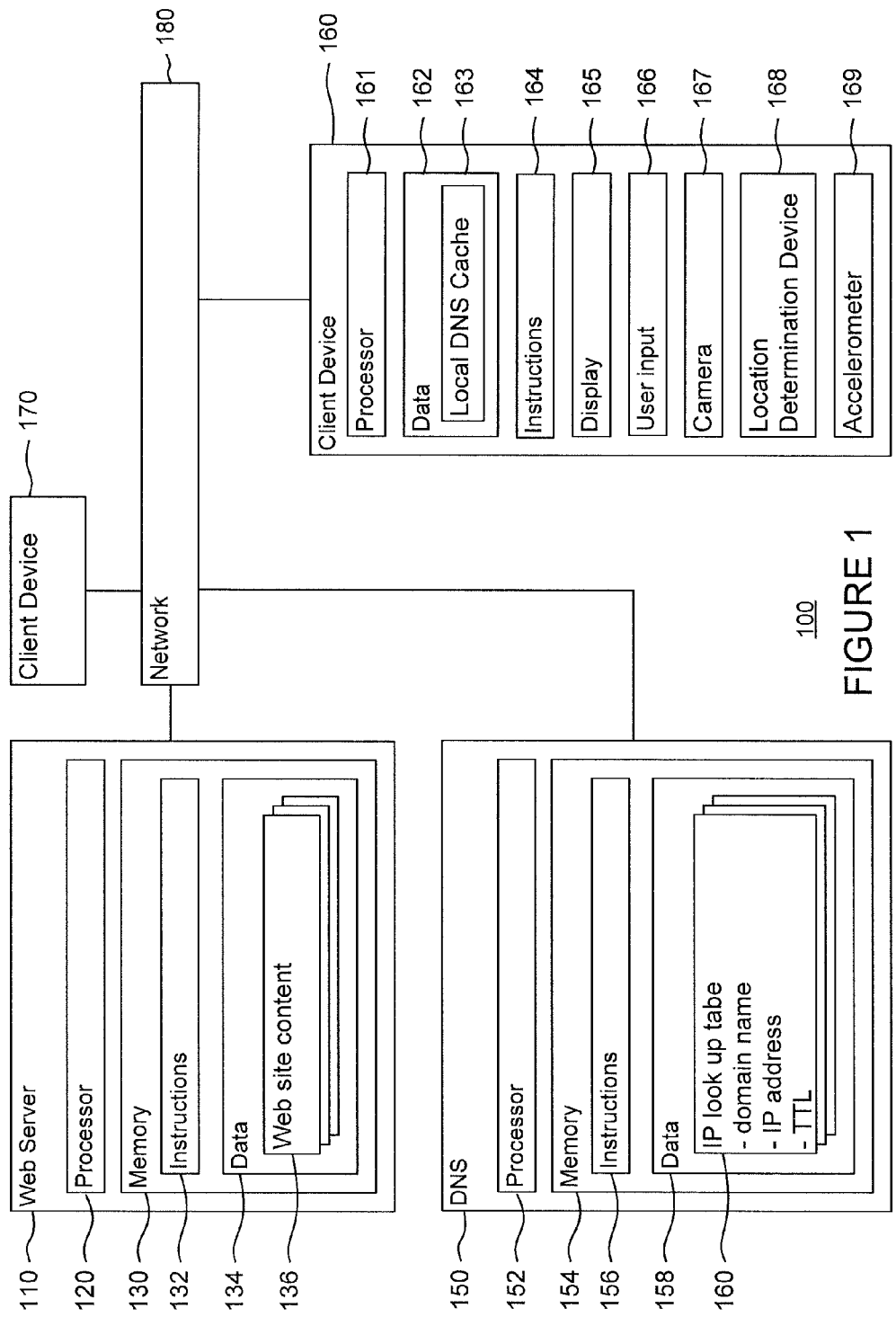
FIG. 1 is a functional diagram of a system in accordance with an aspect of the invention.
Figure 2:
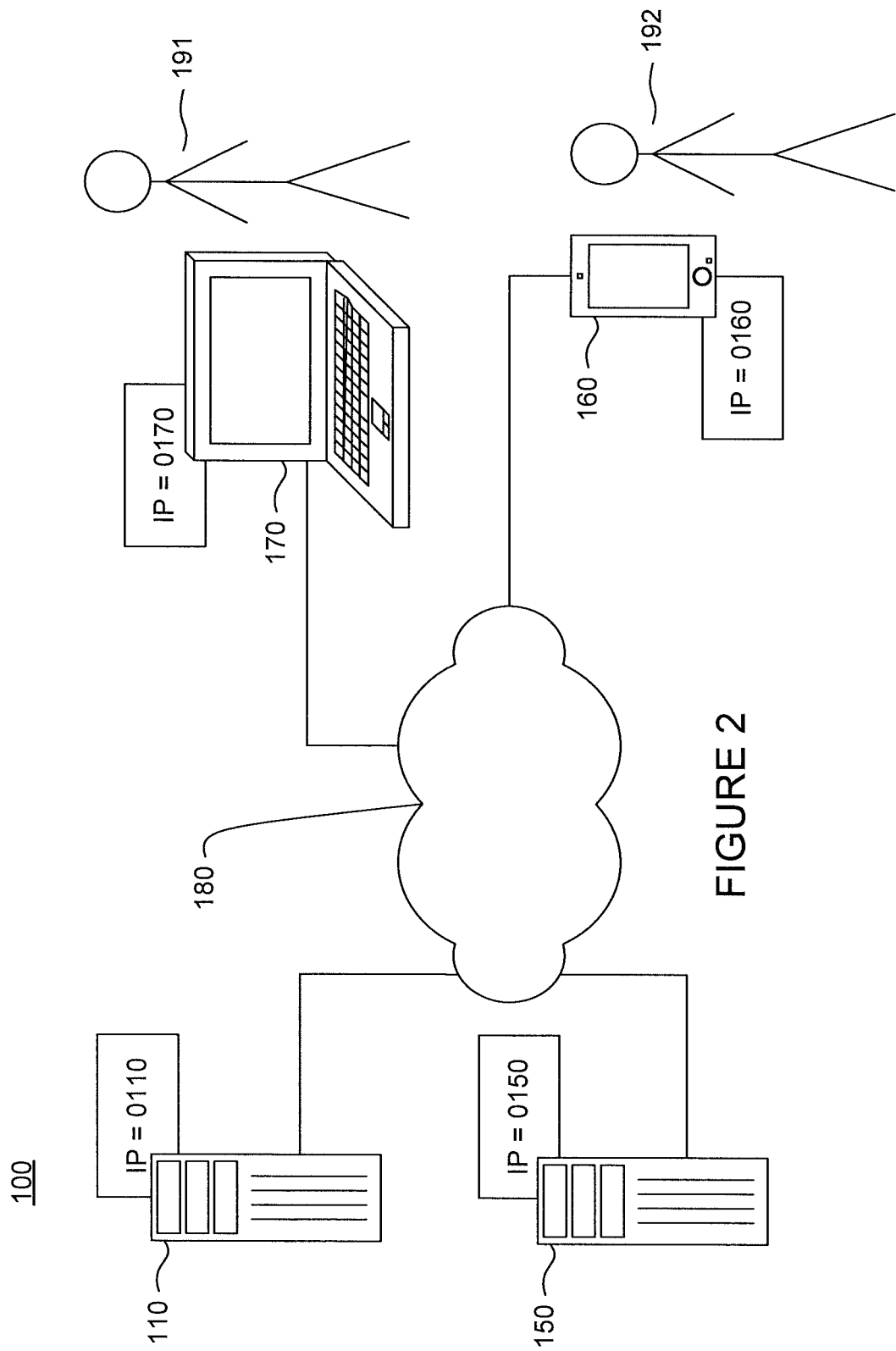
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a harddrive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents, etc. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers that may or may not operate in parallel.

The computer 110 may be at one node of a network 180 and capable of directly and indirectly communicating with other nodes of the network. For example, computer 110 may comprise a web server that is capable of communicating with client devices 160 and 170 via network 180 such that server 110 uses network 180 to transmit and display information to a user, for example, on display 165 of client device 170. Accordingly, data 134 of server 110 may include web site content 136 used to generate and display the web site "www.a.com" on client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Similar to server 110, DNS 150 may comprise a server including a processor 152, memory 154, and instructions 156 as described above. Data 158 may includes in IP address lookup table which maps associations between domain names and IP addresses. In this regard, in response to receiving a request identifying a domain name, for example "www.a.com," from a node of network 180, DNS 150 may provide the requesting node with an IP address. As will be described in more detail below, the IP addresses provided by DNS 150 may be associated with a time-to-live ("TTL"). The TTL is a time limit after which the IP address may no longer be valid. A TTL may be as little as a few seconds, minutes, hours or much longer.

Network 180, and intervening nodes between server 110, DNS 150, and client devices, may comprise various configurations and use various protocols including the Internet, World Wide Web, intranets, virtual private networks, local Ethernet networks, private networks using communication protocols proprietary to one or more companies, cellular and local wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each node on the network may be associated with both a network address and a physical address. For example, each device may be assigned an IP address. An IP address may be expressed as binary numbers or various combinations of numbers, letters, or both. For example, as depicted in FIG. 2, client devices 160, 170, server 110 and DNS 150 may each be identified by an IP address, for example 0160, 0170, 0110, and 0150, respectively. It will be understood that the IP addresses are typically 32-bits or 64-bit integers and may be displayed in various ways, for example 3479374081 or 207.99.9.1.

Each client device may be configured similarly to servers 110 and 150, with a processor, memory and instructions as described above. Each client device 160 or 170 may be a personal computer intended for use by a person 191-192, and have all of the components normally used in connection with a personal computer such as a central processing unit (CPU) 161, memory (e.g., RAM and internal hard drives) storing data 162 (including cached data 163), and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, location determination device 168 (such as a GPS receiver or geolocation software), speakers, a network interface device, an accelerometer 169, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Data 162 of client device 170 may also include local DNS cache 163. For example, the local DNS cache may store or retain data such as one or more domain names as well as the associated IP address and TTL. As will be described in more detail below, as the TTL expires, the client device may retain the data until it is replaced by updated IP address and TTL information.

In addition to the operations described below and illustrated in the figures, various operations in accordance with a variety of aspects of the invention will now be described. It should also be understood that the following operations do not have to be performed in the precise order described below. Rather, various steps can be handled in a different order or simultaneously.

Figure 3A:
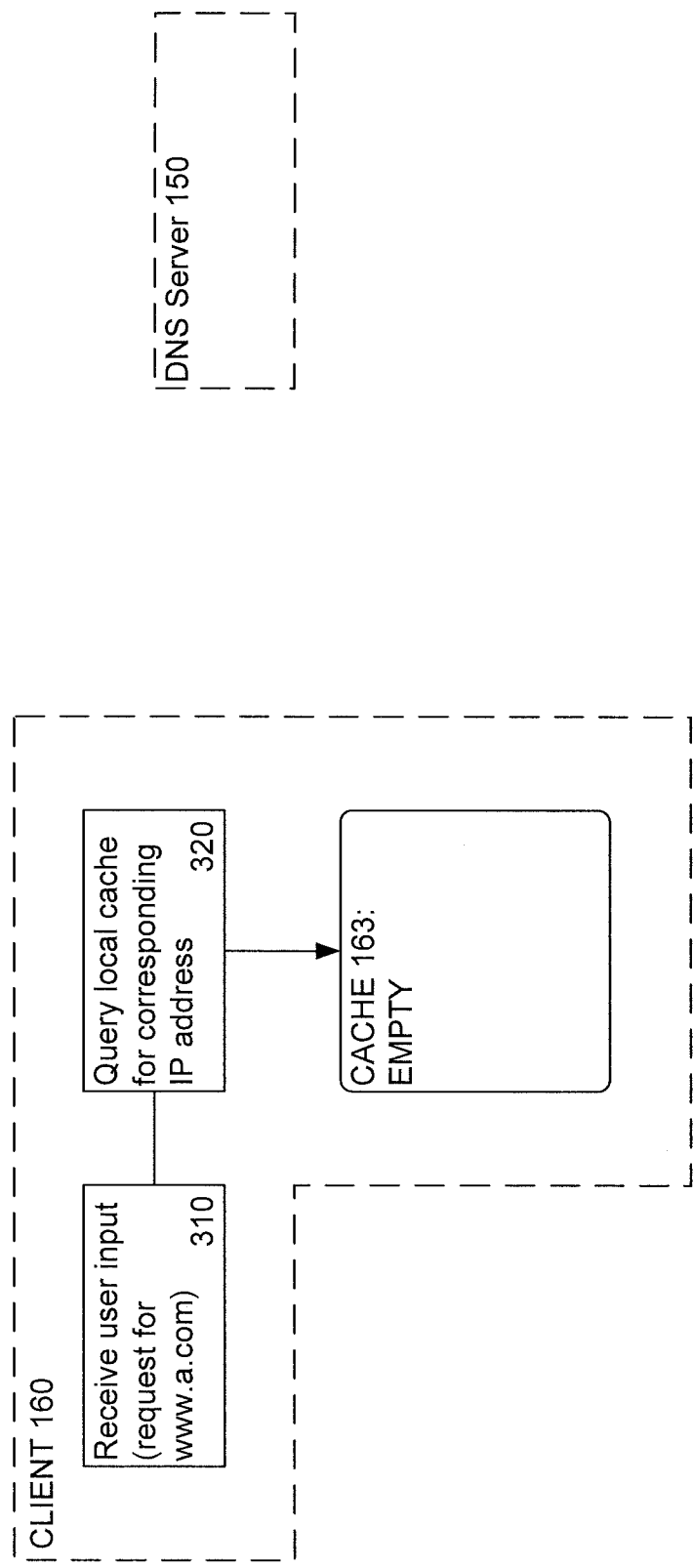
FIGS. 3A-3E are a functional diagram of a system in accordance with an aspect of the invention.
Figure 3B:
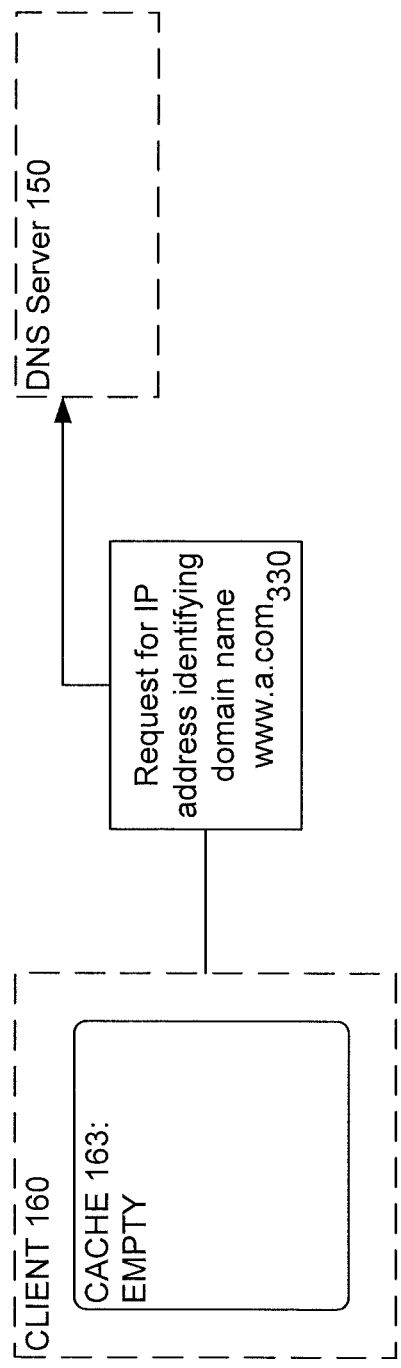

A user may request a particular web site, for example, by entering the domain name into a browser of the user's client device. Once the client device has received the domain name, the client device, by way of its processor, may query the local DNS cash for the corresponding IP address. As shown in FIG. 3A, client device 160 receives user input, such as a request for www.a.com, at block 310. Client device 160 queries the local cache 163 for the corresponding IP address at block 320. In the example, cache 163 does not contain the corresponding IP address. This may occur, for example, if the client device has not previously requested www.a.com, or alternatively if the cache had been wiped to remove this information. As a result, as shown in FIG. 3B, the client device may query DNS server 150 for the IP address information by sending a request for the IP address identifying the domain name as shown in block 330.

Figure 3C:
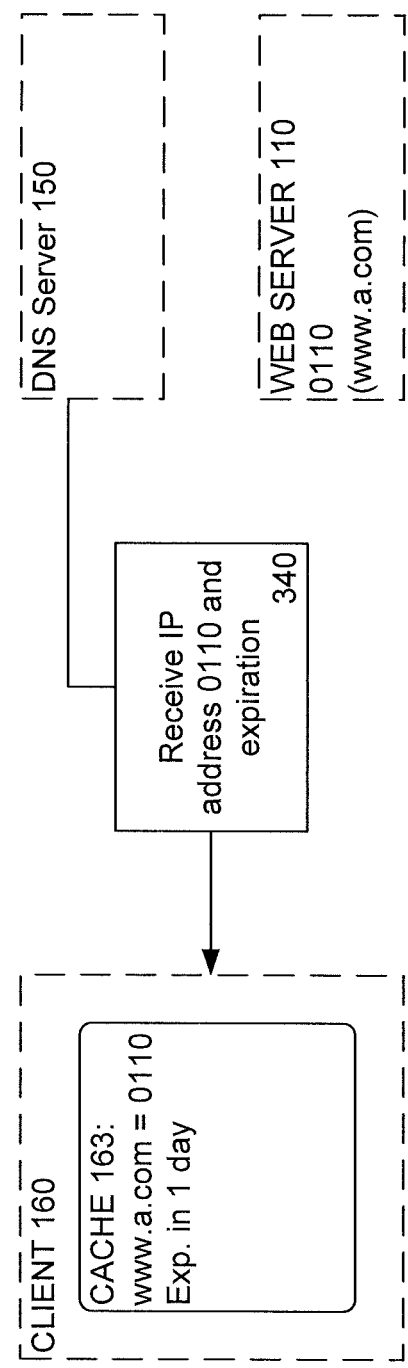

The DNS may identify an IP address and associated TTL or expiration information based on the received domain name. DNS 150 may transmit this information, for example the IP address 0110 and a 1-day expiration, to client device 160 as shown in block 340 of FIG. 3C. The client device may store the received IP address and expiration information in the local DNS cache. Thus, in FIG. 3C, cache 163 is updated with the web site, IP address, and expiration information.

Figure 3D:
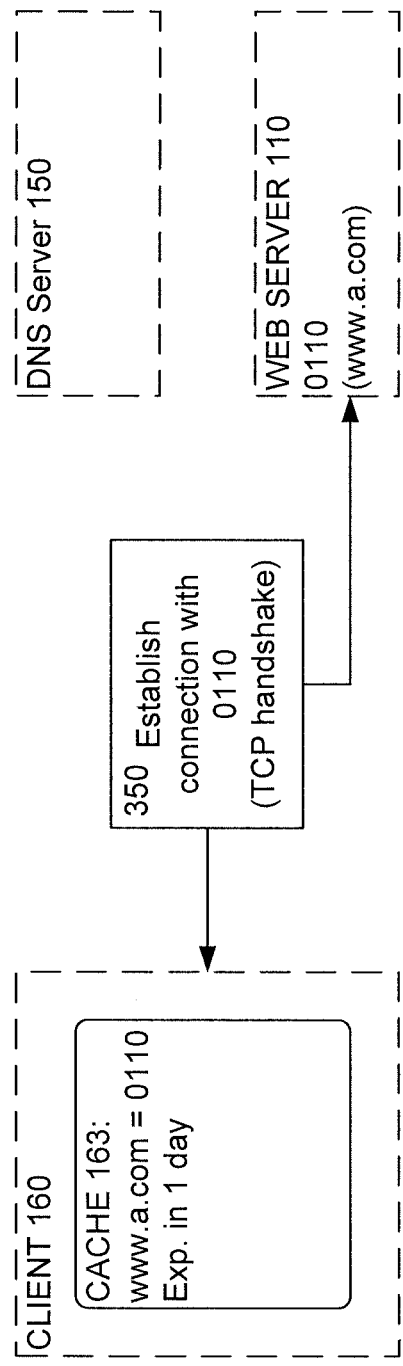

Once the client device has received the IP address from the DNS, the client may establish a connection with the received IP address. As shown in FIG. 3D, client device 160 establishes a connection with server 110 at IP address 0110 at block 350. For example, the client device may establish a Transmission Control Protocol ("TCP") connection with server 110 by utilizing a three-way handshake. The handshake may comprise various steps including: the client device transmitting a synchronize message to the server; in response, the server transmitting a synchronize message and an acknowledgement message; and the client device returning the acknowledgment message to the server. Once server 110 has received the acknowledgement message, the connection is established.

Figure 3E:
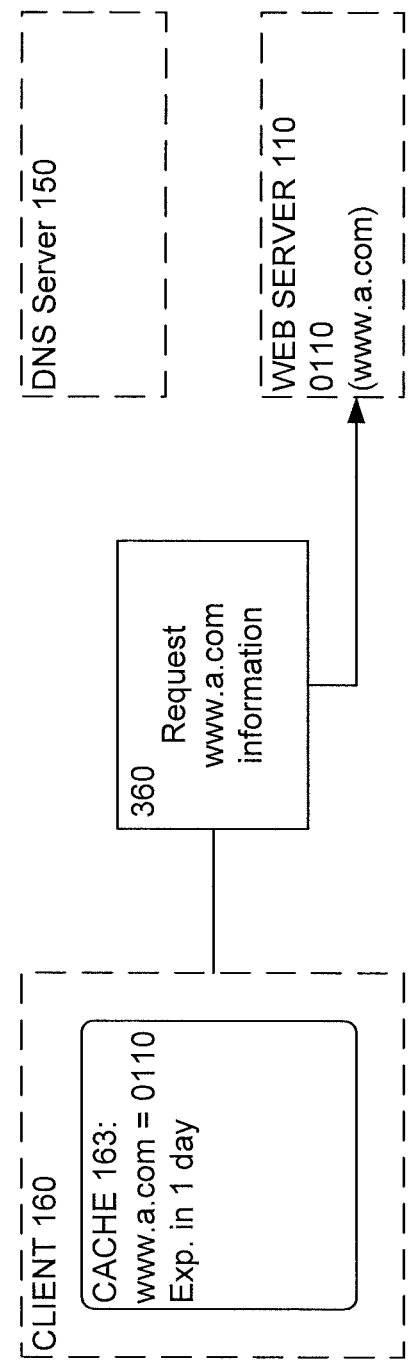

After the establishment of the TCP connection, the client device may initiate an HTTP session with the server and request the web site information. For example, as shown in FIG. 3E, client device 160 transmits a request for the www.a.com information from server 110 at block 360.

Figure 4A:
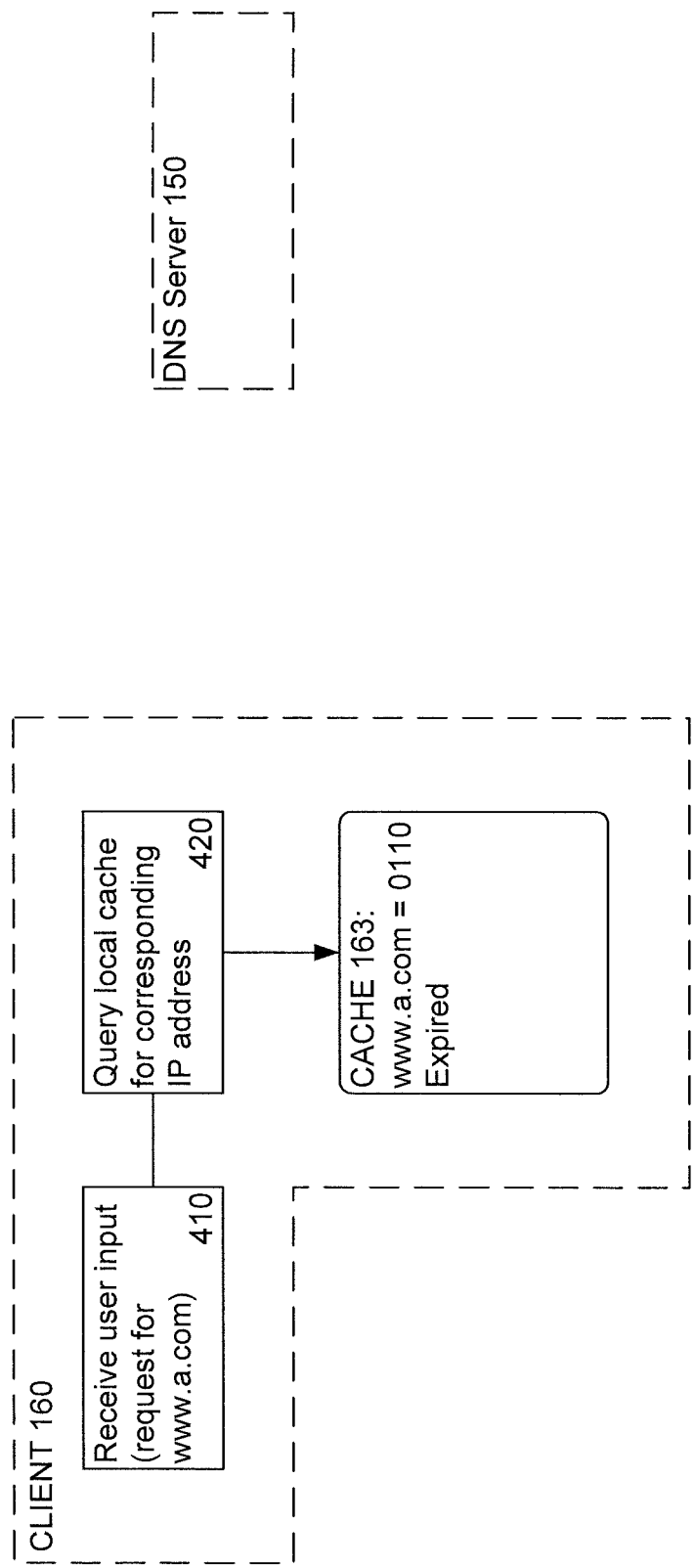

As the client device has previously requested the IP address of the web site, the client device's cache now contains the IP address associated with the requested web site. Turning to FIG. 4A, client device receives user input including a request for the web site www.a.com at block 410. Client device queries the local cached for the corresponding IP address at block 420. Cache 163 includes the IP address of www.a.com as the client device has previously requested this information from DNS 150. In the example, the cached information also includes a TTL which has expired. Thus, when the user requests www.a.com again, the client device will query the local DNS cache for the corresponding IP address, 0110, and determine that the IP address has expired.

Figure 4B:
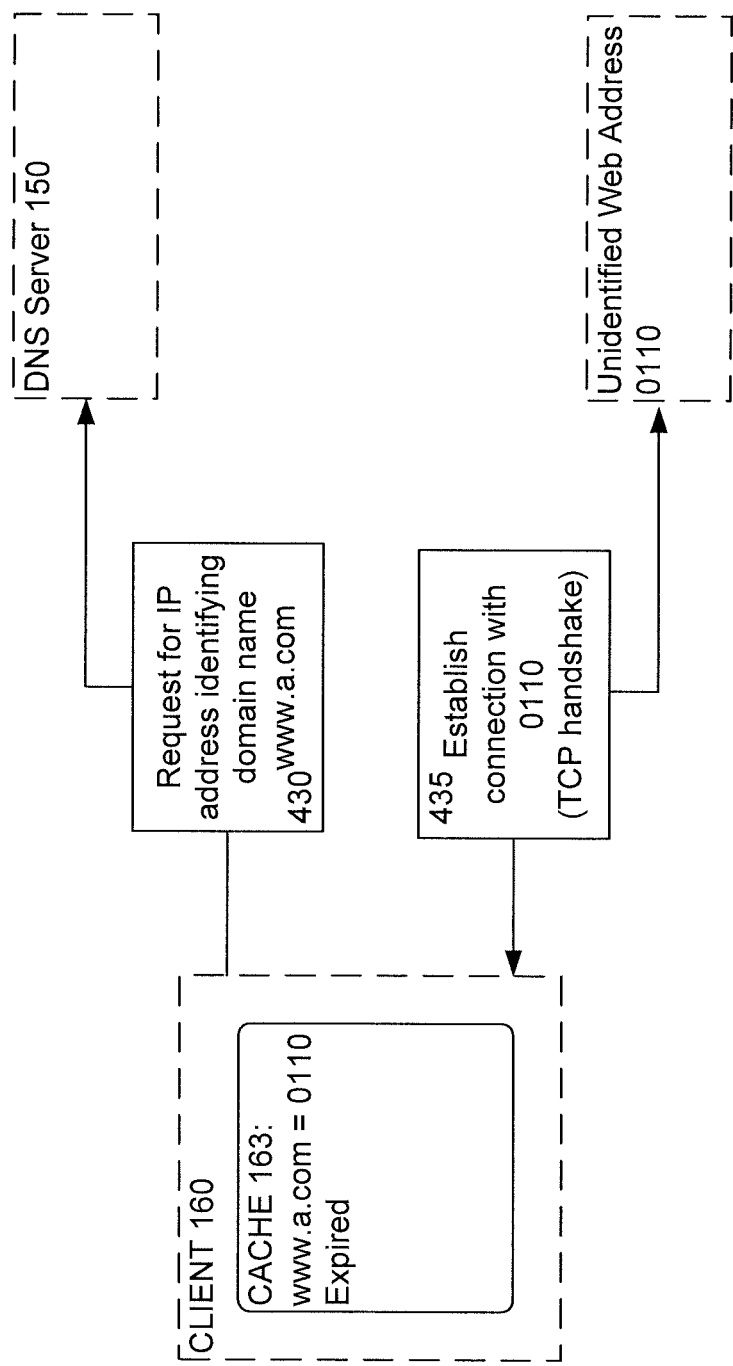

Rather than simply querying the domain name server for the updated IP address and TTL for the web site, the client device may transmit a request to domain name server and at the same time establish a connection with the expired IP address. For example, as shown in FIG. 4B, client device 160 transmits a request for the current IP address of www.a.com to DNS 150. At the same time, client device 160 attempts to establish a connection, for example, the TCP handshake described above, with the expired IP address stored in cache 163, 0110, as shown in block 435. At this time, the client device is unable to identify what is currently using the web address 0110 (shown in FIG. 4B as "Unidentified Web Adderess"). Thus, the client device may request the updated IP address and TTL information from DNS 150. As the IP address 0110 associated with www.a.com has expired, this IP address may no longer identify the network location of www.a.com. Thus, rather than establishing the connection with 0110 and initiation an HTTP session to retrieve web site information, the client device may simply establish the connection with 0110 (e.g. a three-way handshake as described above) without establishing an HTTP session or sending any additional requests for web site or other information to 0110. Again, both requests may be sent concurrently, or as close to the same time as possible depending on the capabilities of the client device.

Immediately sending a request for web site or other information to an expired IP address prior to confirming its accuracy may actually result in security or privacy issues. For example, the actual IP address of www.a.com may have changed since the expiration of the TTL. Thus, www.a.com may no longer be administered by the server located at 0110, and any information sent to this location may be susceptible to exposure to third parties.

Figure 4C:
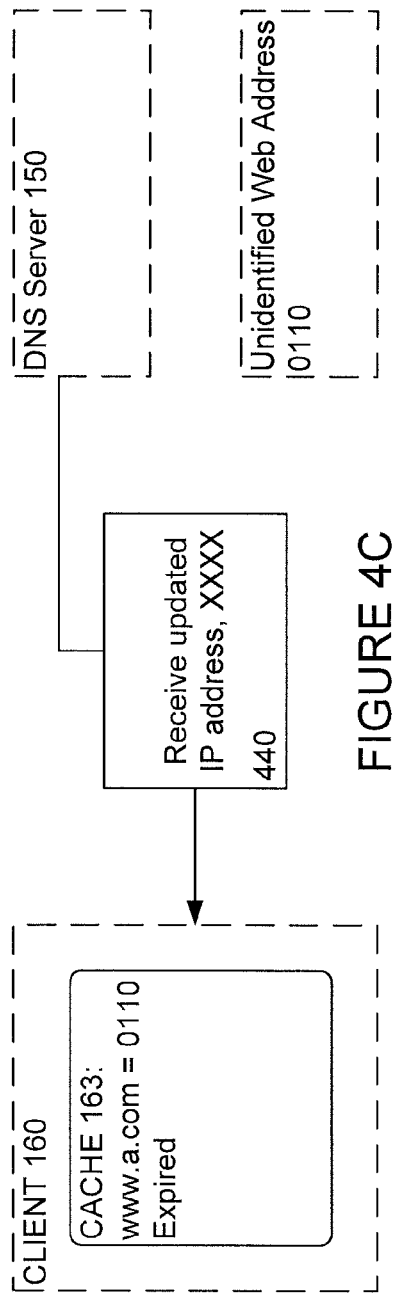
Figure 4D:
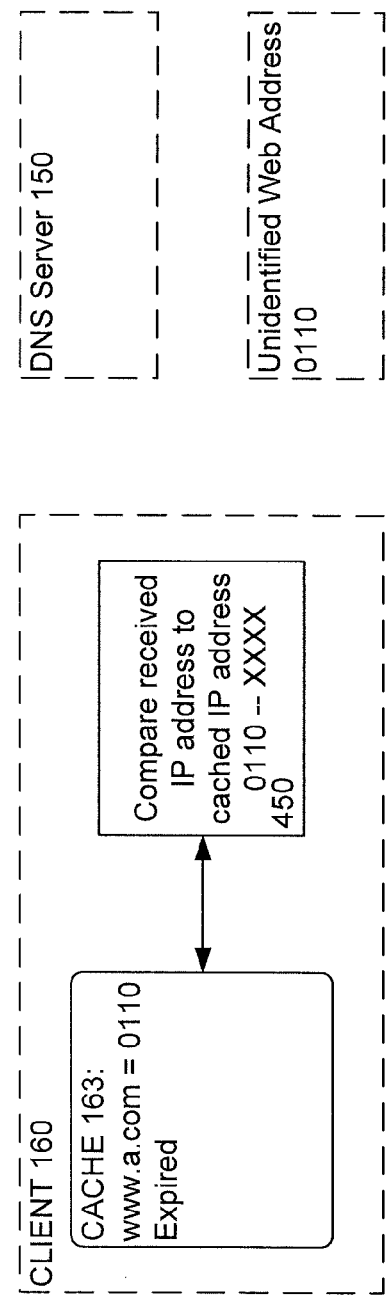

Once the client device receives the updated IP address from the domain name server, the client device may compare the received IP address to the cached IP address. As shown in FIG. 4C, DNS 150 may send the updated IP address, "XXXX" associated with www.a.com to client device 160. Then, client device 160 compares the received IP address to the expired addressed stored in cache 163 at block 450 of FIG. 4D.

If, the updated IP address is the same as the expired IP address, the client device may initiate the HTTP session with the network node of the expired IP address. The client device may also update the cache memory with the received IP address and updated expiration information. As shown in FIG. 4E, client device 160 determined that the received IP address XXXX is the same as the cached IP address, 0110. Client device 160 updates the cache 163 with the received IP address, XXXX, and updated expiration information as shown in block 460. Client device 160 establishes an HTTP session with the previously unidentified web address, now identified as server 110, for www.a.com at block 470.

If the updated IP address is not the same as the expired IP address, the client device may abort the connection with the node of the received IP and establish a new TCP connection with the received IP address as shown. For example, as shown in FIG. 4F, XXXX≠0110. Again, Client device 160 updates the cache 163 with the received IP address, XXXX, and updated expiration information as shown in block 480. The client device also aborts the connection with the unidentified web address (IP address 0110) at block 490. Client device 160 then establishes a new connection with the received IP address and requests www.a.com at block 495.

Immediately after establishing the new TCP connection, the client device may request the web site information for www.a.com from the node of the updated IP address. Thus, in this example, the client device sends requests for information to the expired IP address only after the comparison of the expired to the updated IP address. As a result, the risk of the information being exposed to third parties not associated with the actual web site is greatly reduced. Further, the client device does not waste bandwidth downloading dated information from the incorrect IP address only to dispose or update the information later, thus saving additional time and bandwidth.

Figure 5:
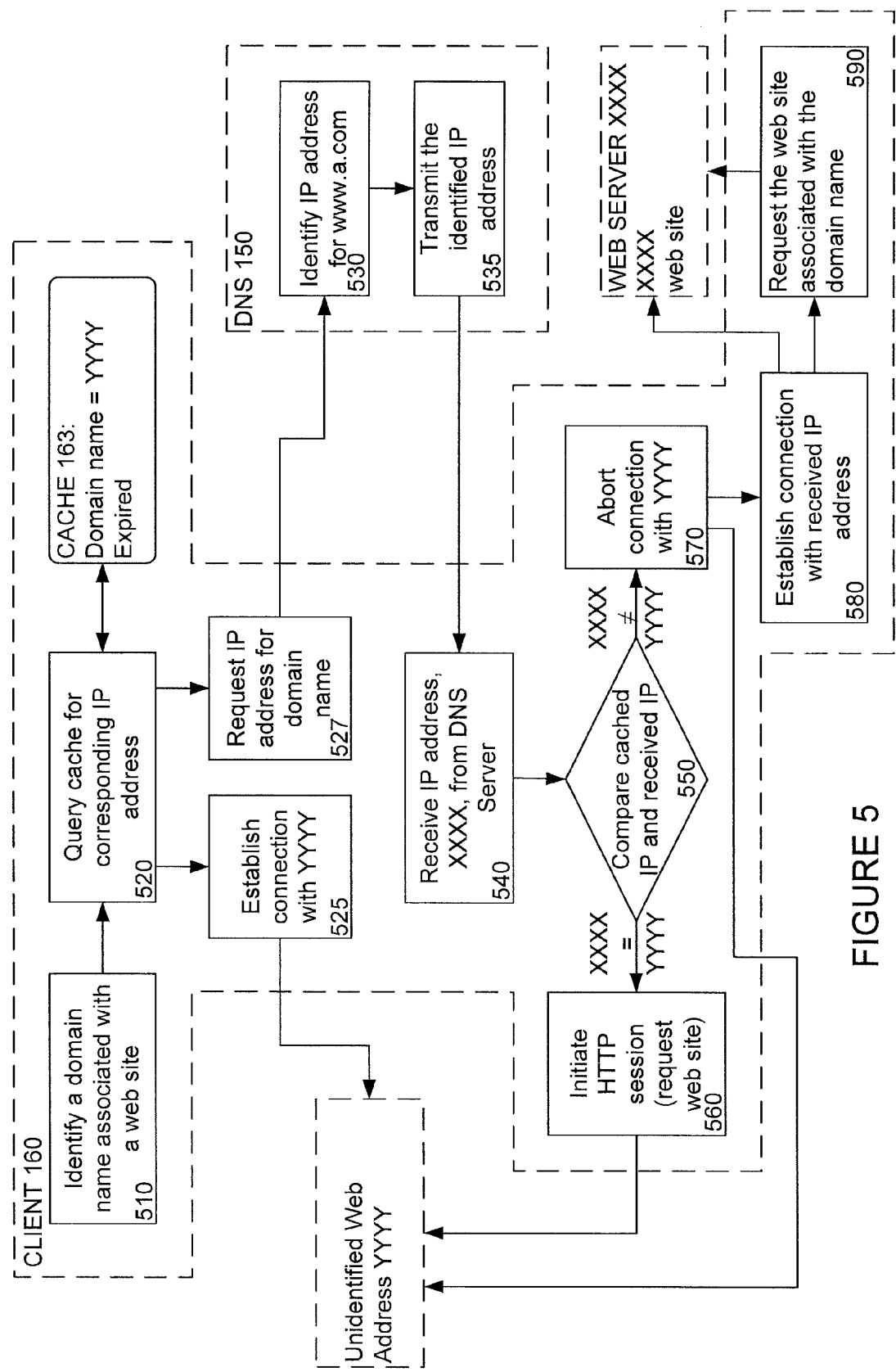
FIG. 5 is a flow diagram in accordance with an aspect of the invention.

FIG. 5 is a flow diagram of the process described above. As shown in block 510, client device 160 identifies a domain name associated with a web site, for example, based on user input. The client device queries local cache 163 and identifies an expired IP address, for example "YYYY," at block 520. The client device then concurrently (1) establishes a connection with the node of YYYY at block 525 and (2) requests an IP address for the domain name at block 527. DNS 150 receives the request and identifies an IP address for the domain name at block 530. The DNS transmits the identified IP address, for example "XXXX," at block 535 which is received by the client device at block 540. The client device then compares the cached IP address and the received IP address at block 550. If XXXX=YYYY, then the client device will initiate an HTTP session with the unidentified web address YYY (or the node of YYYY) at block 560. If XXXX YYYY, then the client device will abort the connection with the node of YYYY at block 570 and establish a new connection with the node of the received IP address XXXX (web server XXXX) at block 580. Using the new connection, the client device will request the web site associated with web server XXXX as shown in block 590.

Although the examples provided above relate to web protocols, specifically HTTP, it will be understood that the invention may be implemented with any number of services which use the DNS service. For example, DNS is also used with email services (such as where an email client requests the location @gmail.com), Voice Over Internet Protocol (VOIP) services, and other client-server applications. Furthermore, the domain name need not be inputted by a user, but may be provided to the server by way of an application, operating system, or program. For example, where an application of a client device is requesting access a user's email account, the application does not identify the email server by the IP address, but rather the domain name.

It will be understood that the features described above, in addition to being implemented at an application level, may also be utilized as a combination of operating system and application level processing. For example, returning to FIG. 5, establishing the connection with the various web locations (YYYY and XXXX) at blocks 525 and 580 may be an operating system service, while querying the cache at block 520 and comparing the ached IP and received IP at block 550 may be provided as user-level library services. Requesting the actual website (initiating the HTTP session) at blocks 560 and 590 may be implemented in an application. Thus, the system and method may be provided in a new operating system which combines all of the features of FIG. 5 and those described above. This would increase the transparency of the process and prevent the client application (perhaps accidentally) from using the tentative connection before being fully verified (see block 550).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method, comprising:
   identifying, by a processor, a domain name associated with a node on a network;
   retrieving an expired IP address stored in memory accessible by the processor, the expired IP address being associated with the domain name and an expired time period;
   establishing a connection between the processor and the node of the network based on the expired IP address;
   while establishing the connection, transmitting a request to a domain name server for an updated IP address based on the domain name;
   comparing the updated IP address with the expired IP address to determine if the updated IP address is the same as the expired IP address; and
   if the updated IP address is the same as the expired IP address, establishing an HTTP session with the node of the network based on the expired IP address.

2. The method of claim 1, further comprising establishing the http session and transmitting a request for content to the node only if the updated IP address is the same as the expired IP address.

3. The method of claim 1, further comprising:
   aborting the connection if the updated IP address is different from the expired IP address;
   establishing a second connection with a second node of the network based on the updated IP address; and
   requesting content from the second node.

4. The method of claim 1, further comprising:
   receiving the updated IP address and an associated expiration; and
   storing the updated IP address and the associated expiration in the memory.

5. The method of claim 1, wherein the memory is cache memory.

6. The method of claim 1, wherein the established connection is a TCP connection with the node.

7. The method of claim 1, wherein the updated IP address is associated with an email server.

8. The method of claim 1, wherein the updated IP address is associated with a VOIP server.

9. The method of claim 1, wherein the updated IP address is associated with a web site server.

10. A device, comprising:
    memory for storing IP addresses;
    a processor coupled to the memory and being operable to:
       identify, a domain name associated with a web site;
       retrieve an expired IP address stored in memory accessible by the processor, the expired IP address being associated with the domain name and an expired time period;
       establish a connection between the processor and a node of the network based on the expired IP address;
       while establishing the connection, transmit a request to a domain name server for an updated IP address based on the domain name;
       compare the updated IP address with the expired IP address to determine if the updated IP address is the same as the expired IP address; and
       transmit a request for content to the node only if the updated IP address is the same as the expired IP address.

11. The device of claim 10, wherein the processor is further operable to:
   abort the connection if the updated IP address is different from the expired IP address;
   establish a second connection with a second node of the network based on the updated IP address; and
   request content from the second node.

12. The device of claim 10, wherein the processor is further operable to:
   receive the updated IP address and an associated expiration; and
   store the updated IP address and the associated expiration in the memory.

13. The device of claim 10, wherein the memory is cache memory.

14. The device of claim 10, wherein the established connection is a TCP connection with the node.

15. The device of claim 10, wherein the updated IP address is associated with an email server.

16. The device of claim 10, wherein the updated IP address is associated with a VOIP server.

17. The device of claim 10, wherein the updated IP address is associated with a web site server.

* * * * *